Sept. 13, 1927.　　　　　A. DE JOUËTTE　　　　　1,642,606
CLUTCH DEVICE
Filed Sept. 2, 1926　　　2 Sheets-Sheet 1
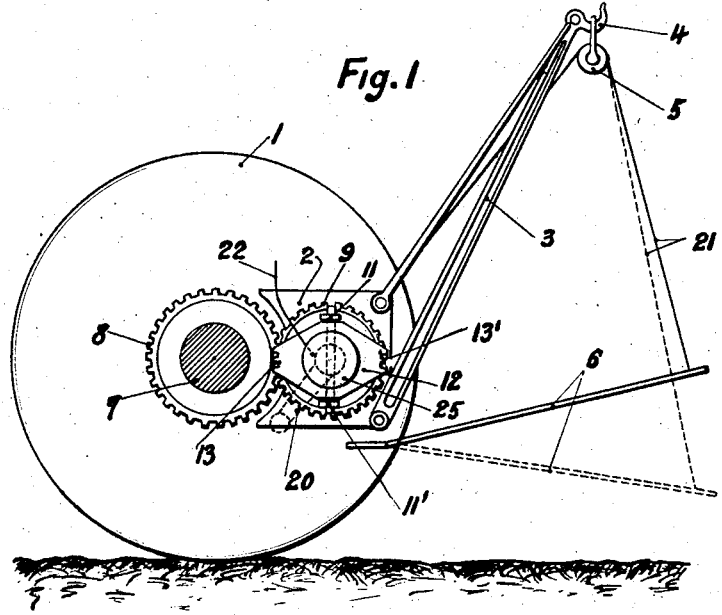
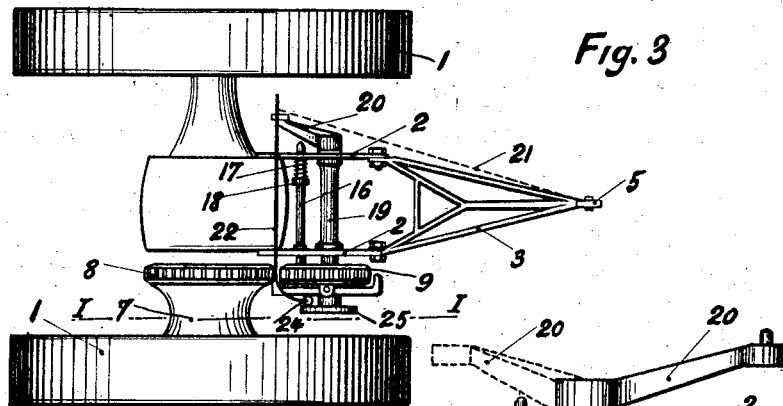
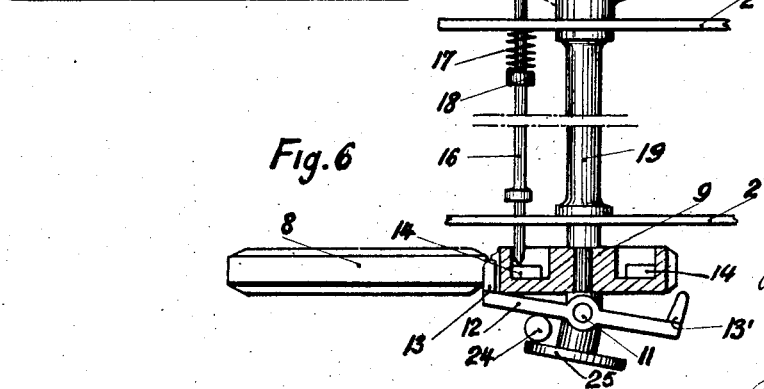
A. de Jouëtte
Inventor
By Marks & Clerk
Attys.

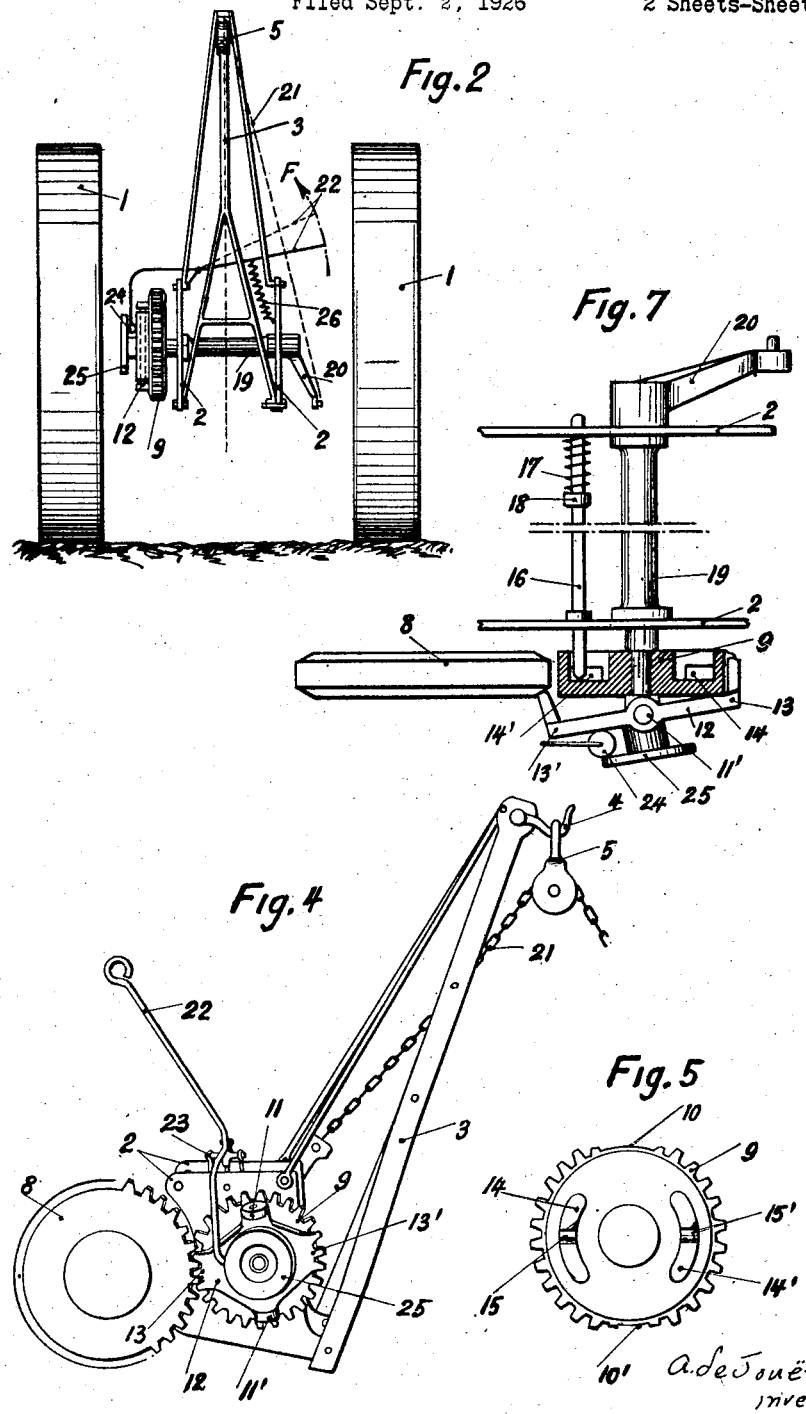

Patented Sept. 13, 1927.

1,642,606

UNITED STATES PATENT OFFICE.

ALBERT DE JOUËTTE, OF NANTERRE, FRANCE.

CLUTCH DEVICE.

Application filed September 2, 1926, Serial No. 133,233, and in France September 9, 1925.

My invention has for its object a clutch device adapted to provide half revolutions for control arrangements such as for instance those used on agricultural vehicles for raising the tools.

I have shown a form of execution of this clutch device diagrammatically on appended drawings as adapted to the control arrangement of the raising of agricultural tools on a vehicle, this raising being provided by means known per se.

Fig. 1 is a side view with a sectional part taken along line 1—1 of Fig. 3 of the whole automatic raising device comprising my improved clutch.

Fig. 2 is a rear view thereof.

Fig. 3 is a plan view.

Fig. 4 is a perspective view of the controlling parts.

Fig. 5 is a front view at an enlarged scale of the toothed wheel forming one part of the clutch device.

Fig. 6 is a plan view partly sectional of several parts of the device as they are set when the tools are being moved.

Fig. 7 is a corresponding plan view wherein the same parts are shown as they are set when the tools are secured in either their raised or lowered position.

The whole device is borne by the power-driven vehicle, the rear wheels of which are shown at 1. To the rear of the vehicle are secured two supports 2 bearing the jib 3 to the top of which is hung through the hook 4, a pulley 5. Besides movable arms such as 6, adapted to be raised or lowered and bearing the tools (not shown on the drawing) are pivotally secured to the frame.

To the hub 7 of one of the wheels 1, is keyed a toothed wheel 8 meshing with a second toothed wheel 9 which shows (see Fig. 5) at the two ends of one same diameter interruptions 10, 10' in the peripheral teeth.

The outer side of the wheel 9 bears two trunnions 11, 11' (Figs. 1 and 4) at the opposite ends of the diameter perpendicular to the diameter 10, 10'.

A disc 12 is pivotally mounted on these trunnions and is provided with two toothed segments 13, 13' disposed in front of those parts 10, 10' of the wheel 9 which are devoid of teeth.

The inner side of the wheel 9 (Fig. 5) is provided with two diametrically opposed projections showing each two slopes 14, 14' inclined towards a notch 15, 15' disposed in the middle of each projection. Thus each of the guiding slopes leading down to either side of each notch 15, 15' make up a double inclined plane whereby the movement to and away from these notches of a bolt device of the wheel 9 is made easier. This bolt device comprises a rod 16 ending with a chamfered point (Figs. 3, 6 and 7) and constantly urged by the spring 17, disposed between one of the supports 2 and a shoulder 18, against the wheel 9.

To the end of the shaft 19 of the wheel 9 is keyed a crank 20 to the crank pin of which is secured the end of a chain 21 passing over the pulley 5 and the other end of which is secured to the tool bearing arms 6. There are thus two idle positions for the crank wherein it is parallel to the chain 21. When it is at its higher idle position the tools are lowered in their working position; when it is at its lower idle position, they are in their raised position.

A lever 22 the free end of which is placed in front of the driver is pivoted at 23 so as to be allowed to oscillate in a direction perpendicular to the movement of the vehicle. Its end is bent and ends with a roller 24 set between the disc 12 and an auxiliary disc 25 secured to the said disc 12. Thereby the lever when it moves makes the disc pivot round the trunnions 11, 11'. A spring 26 (Fig. 2) urges the lever 22 constantly back into a predetermined position.

The working of the device is the following:

When the tools are raised, the crank 20 is at its lower idle position (Fig. 1). One of the parts 10, 10' devoid of teeth on wheel 9 is in front of the wheel 8 and the position of the lever 22 is such as will prevent the teeth 13 of the disc 12 from meshing with the teeth of the wheel 8. The result is that when this wheel 8 rotates together with the wheels of the frame 1, the disc 12 and wheel 9 will remain motionless; besides the bolt 16 engaging one of the notches 15, 15' of the wheel 9 would prevent any accidental movement of the latter. Thus the wheels remain raised.

For lowering the arms 6 and thereby the tools whilst the vehicle is advancing, it is sufficient to act on the lever 22 and to make it move in the direction of the arrow (Fig. 11

2) against the action of the spring 26. The roller 24 will then bear against the periphery of the disc 12 and make it rotate around the trunnions 11, 11' whereby the said disc is brought into the position shown on Fig. 6 wherein the teeth 13 mesh with the toothed wheel 8. Thus if the vehicle 1 continues its movement, the disc 12 will continue rotating drawing along with it the toothed wheel 9. The shape of the notch 15 and of the inclined slopes 14 will allow the bolt 16 to move out of the said notch 15. Thus the wheel 9 is set free and rotates together with the disc 12 first by means of the teeth 13 of the disc and then by those of the wheel 9. In the meantime, the lever 22, set free by the driver comes back into its original position under the action of the spring 26 and the disc 12 returns to the position shown on Fig. 7. The result is that when the part 10' devoid of teeth of the wheel 9 comes in front of the toothed wheel 8, the wheel 9 and disc 12 can no longer be made to rotate by the said wheel 8. The crank 20 is thus brought to its higher idle position. Moreover the spring 17 urges the bolt 16 along the slope 14' into the notch 15'. The wheel is thus prevented from moving and the tools are kept down in their working position, the arm 6 being in the position shown in dotted lines on Fig. 1. When it is desired to raise again the tools, it is sufficient to act again in the same manner on the lever 22 whereby the disc 12 having again pivoted round its trunnions, the wheel 9 may again rotate by one half revolution and bring the crank 20 back to its lower idle position.

Evidently the shape, material, and arrangement of the clutch device may be varied at will within the scope of the following claims.

What I claim is:

1. A clutch device comprising a controlling toothed wheel, a part to be controlled, a second toothed wheel showing two diametrically opposed parts devoid of teeth and adapted to mesh with the first mentioned controlling toothed wheel, a disc coaxial with second toothed wheel and pivotally secured thereto along a diametral axis perpendicular to the diameter joining the tooth-free parts of the second wheel, the teeth provided on the said disc on those parts thereof which correspond to the tooth-free parts of the second toothed wheel and adapted to mesh with the controlling toothed wheel, a lever adapted to make the disc rotate round its pivoting axis and its teeth engage the first toothed wheel and means whereby the second wheel is operatively connected with the part to be controlled.

2. In a clutch device as claimed in claim 1, a roller secured to the lever and fitting inside the disc and a spring urging said lever into the position wherein it holds the disc in its inoperative position.

3. In a clutch device as claimed in claim 1, projections disposed at diametrically opposite positions on the second toothed wheel, a notch in the center of each projection, slopes on said projections leading to said notch and a spring-urged bolt adapted to cooperate with said notch when the second toothed wheel is out of gear with the first controlling toothed wheel.

In testimony whereof I have affixed my signature.

ALBERT DE JOUËTTE.